United States Patent
Brabeck et al.

(10) Patent No.: US 8,179,663 B2
(45) Date of Patent: *May 15, 2012

(54) CAPACITOR LINER

(75) Inventors: Leo J. Brabeck, New Brighton, MN (US); Jeffrey D. Chaput, Edina, MN (US); Thomas M. Henderson, Stillwater, MN (US); Thomas W. Kanitz, Savage, MN (US); Jeffrey J. Louwagie, Minnetonka, MN (US); Christian S. Nielsen, River Falls, WI (US); Walter C. Sunderland, Eagan, MN (US)

(73) Assignee: Medtronic, Inc., Minneapolis, MN (US)

( * ) Notice: Subject to any disclaimer, the term of this patent is extended or adjusted under 35 U.S.C. 154(b) by 1013 days.

This patent is subject to a terminal disclaimer.

(21) Appl. No.: 12/115,345

(22) Filed: May 5, 2008

(65) Prior Publication Data

US 2008/0304209 A1 Dec. 11, 2008

Related U.S. Application Data

(63) Continuation-in-part of application No. 11/263,040, filed on Oct. 31, 2005, now Pat. No. 7,733,631.

(51) Int. Cl.
*H01G 2/10* (2006.01)

(52) U.S. Cl. ........ 361/517; 361/508; 361/509; 361/516; 361/518; 361/525

(58) Field of Classification Search .................. 361/517, 361/503–504, 508–512, 516, 518, 519, 525
See application file for complete search history.

(56) References Cited

U.S. PATENT DOCUMENTS

| 5,522,851 A | 6/1996 | Fayram |
| 5,930,109 A * | 7/1999 | Fishler .......................... 361/508 |
| 6,191,931 B1 | 2/2001 | Paspa |
| 6,388,866 B1 | 5/2002 | Rorvick |
| 6,678,559 B1 | 1/2004 | Breyen et al. |
| 6,881,516 B2 | 4/2005 | Aamodt et al. |
| 6,963,482 B2 | 11/2005 | Breyen |
| 7,733,631 B2 * | 6/2010 | Brabeck et al. ............... 361/517 |
| 7,872,857 B2 * | 1/2011 | Poplett .......................... 361/512 |
| 2003/0199941 A1 | 10/2003 | Nielsen et al. |
| 2005/0112460 A1 | 5/2005 | Howard et al. |

FOREIGN PATENT DOCUMENTS

EP 1053763 A2 3/2000

OTHER PUBLICATIONS

International Search Report, PCT/US2006/060349, Jun. 29, 2007, 6 Pages.

* cited by examiner

*Primary Examiner* — Nguyen T Ha
(74) *Attorney, Agent, or Firm* — Carol F. Barry

(57) ABSTRACT

A capacitor is presented that includes a housing, an electrode assembly, a liner, and a fill port. The liner is located between the housing and the electrode assembly. The liner includes a recessed portion. A fill port extends through the housing across from the recessed portion in the liner. A gap is formed between the recessed portion and the fill port.

3 Claims, 13 Drawing Sheets

CAPACITOR LINER

CROSS-REFERENCE

This application is a continuation-in-part of U.S. patent application Ser. No. 11/263,040 filed on Oct. 31, 2005 now U.S. Pat. No. 7,733,631. The disclosure of the above application is incorporated herein by reference.

FIELD OF THE INVENTION

The present disclosure relates generally to a capacitor, and more particularly to a liner a capacitor liner.

BACKGROUND

Implantable medical devices (IMDs) detect and treat a variety of medical conditions in patients. Exemplary IMDs include implantable pulse generators (IPGS) or implantable cardioverter-defibrillators (ICDs) that deliver electrical stimuli to tissue of a patient. ICDs typically include, inter alia, a control module, a capacitor, and a battery that are housed in a hermetically sealed container. When therapy is required by a patient, the control module signals the battery to charge the capacitor, which in turn discharges electrical stimuli to tissue of a patient.

The capacitor includes a case, an electrode stack (also referred to as an electrode assembly), an inner liner, and an outer liner. The inner and outer liners surround the electrode stack to mechanically immobilize and prevent the electrode stack from contacting the inside of the case. In the case wall or cover is a fill port or tube, which allows introduction of electrolyte into the case. Electrolyte is a medium that facilitates ionic transport and subsequent segregation at the anode and cathode plates of the electrode stack. Ionic segregation at the anode and cathode plates is necessary to store charge on these plates in the capacitor. To ensure generally uniform ionic transport between the plates, the electrolyte is absorbed by the electrode stack. Absorption of the electrolyte occurs through a process that draws the electrolyte into the case via the fill port. Introduction of electrolyte may be repeated to ensure wetting of separators and electrodes. During this process, some conventional outer liners may become repositioned in a manner that may partially block the fill port and prevent efficient flow of electrolyte and gas via the fill port. It is therefore desirable to develop a liner that overcomes this limitation.

BRIEF DESCRIPTION OF THE DRAWINGS

The present invention will become more fully understood from the detailed description and the accompanying drawings, wherein.

DETAILED DESCRIPTION

Figure 1:
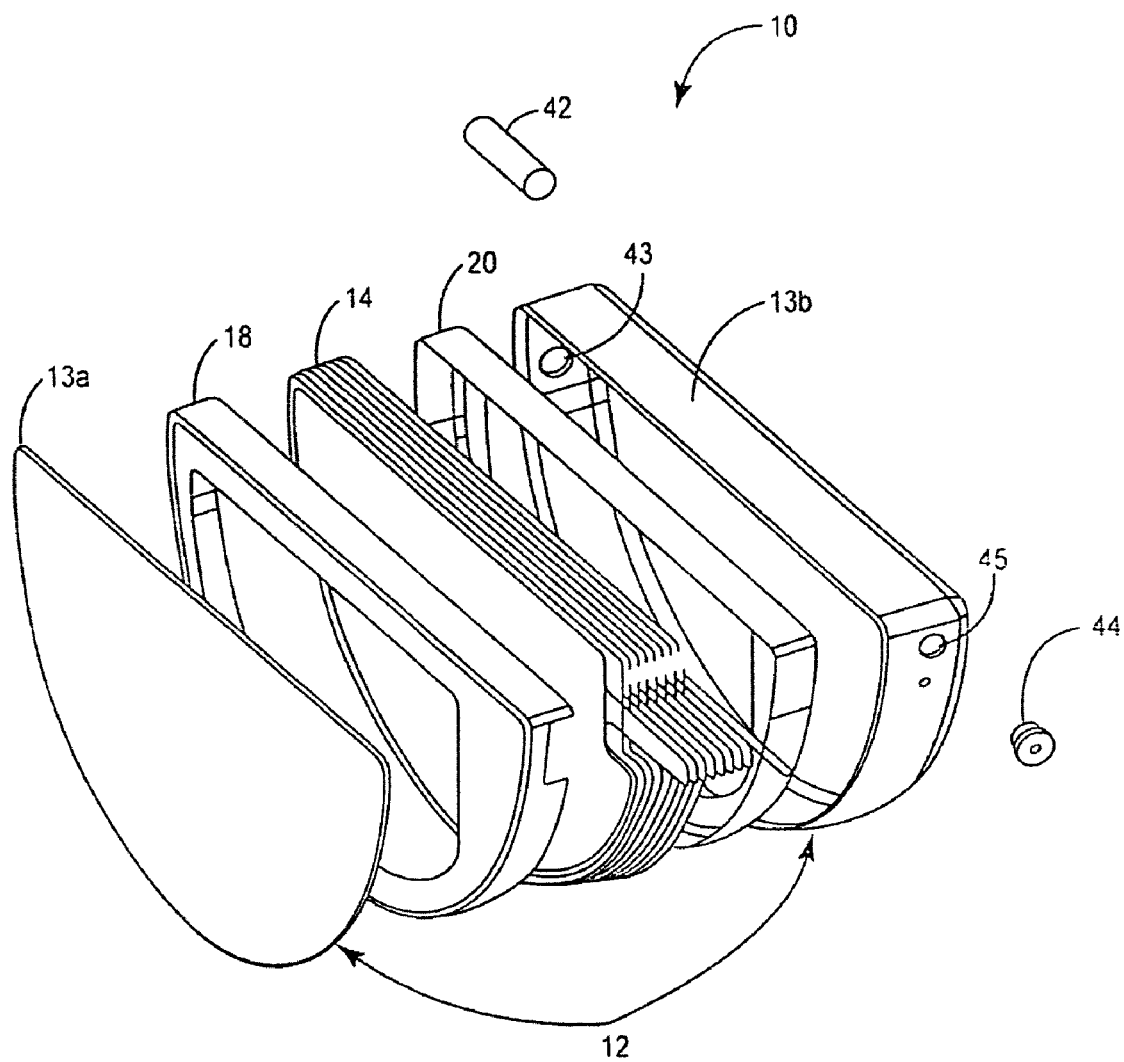
FIG. 1 is a top perspective view of a capacitor.

The following description of the embodiments is merely exemplary and is in no way intended to limit the invention, its application, or uses. For purposes of clarity, the same reference numbers are used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

The present disclosure is directed to an outer liner for a capacitor. The outer liner includes a recessed portion or notch that creates a gap between the outer liner and a fill port to the capacitor. This gap prevents the outer liner from blocking the fill port thereby allowing electrolyte and/or gas to efficiently flow through the fill port. In another embodiment, a plurality of recessed regions formed in the outer liner further enhances venting of gas and/or introduction of electrolyte via the fill port.

FIG. 1 depicts an exemplary capacitor 10 for an implantable medical device (IMD). Capacitor 10 includes a housing 12, an electrode assembly 14 (also referred to as an electrode stack), an inner liner 18, an outer liner 20, a fill port 42 (also referred to as a tube), and a connector 44. Housing 12 is formed of a first portion 13a welded to a second portion 13b. Housing 12 also includes apertures 43, 45 in which fill port 42 and connector 44 are coupled thereto, respectively. Inner and outer liners 18, 20 surround electrode assembly 14 to prevent direct contact between electrode assembly 14 and housing 12.

Electrolyte, introduced inside of housing 12 via fill port 42, contacts inner liner 18, outer liner 20, and electrode assembly 14. Electrode assembly 14, which can comprise a repeated series of an anode plate, a cathode plate, and a separator therebetween, absorbs the electrolyte. In yet another embodiment, Electrode assembly 14 can comprise an anode, a cathode, and a separator therebetween. Generally, absorption of the electrolyte occurs through a process that repeatedly draws the electrolyte into and out of housing 12 via the fill port. A detailed example of such a configuration and process may be seen with respect to United States Patent Application No. 2003/0199941 to Nielsen et al., and assigned to the assignee of the present invention, the disclosure of which is incorporated herein by reference. An electrochemical reaction occurs between the electrolyte and the electrode assembly 14, which produces a gas and an oxide layer over the electrodes. Outer liner 20 efficiently vents the gas out of fill port 42.

FIGS. 2 through 6 depict details of outer liner 20 that ensures efficient flow of electrolyte and/or gas via fill port 42. Outer liner 20 has an outer surface 50 and an inner surface 54. Outer liner 20 comprises a bottom portion 56, a substantially curved side 22, and a substantially straight side 24 that possess a generally uniform thickness of about 0.003 inches but may range from about 0.002 inches to about 0.005 inches. Bottom portion 56 includes an aperture and has a radius (R), extending from center axis (CA) and ranges from about 0.919 inches to about 0.819 inches. Curved and straight sides 22, 24 have a height that ranges from about 0.10 inches to about 0.175 inches. Straight side 24 extends about 1.752 inches and includes a straight portion 26 and a slightly curved cutaway portion 27. Straight portion 26 extends about 1.411 inches. Curved cutaway portion 27 includes a diagonal line 58 that extends from straight portion 26 by an angle θ, which can be about a 45° angle; however, angle θ can range from about 30° to about 60°.

Figure 3A:
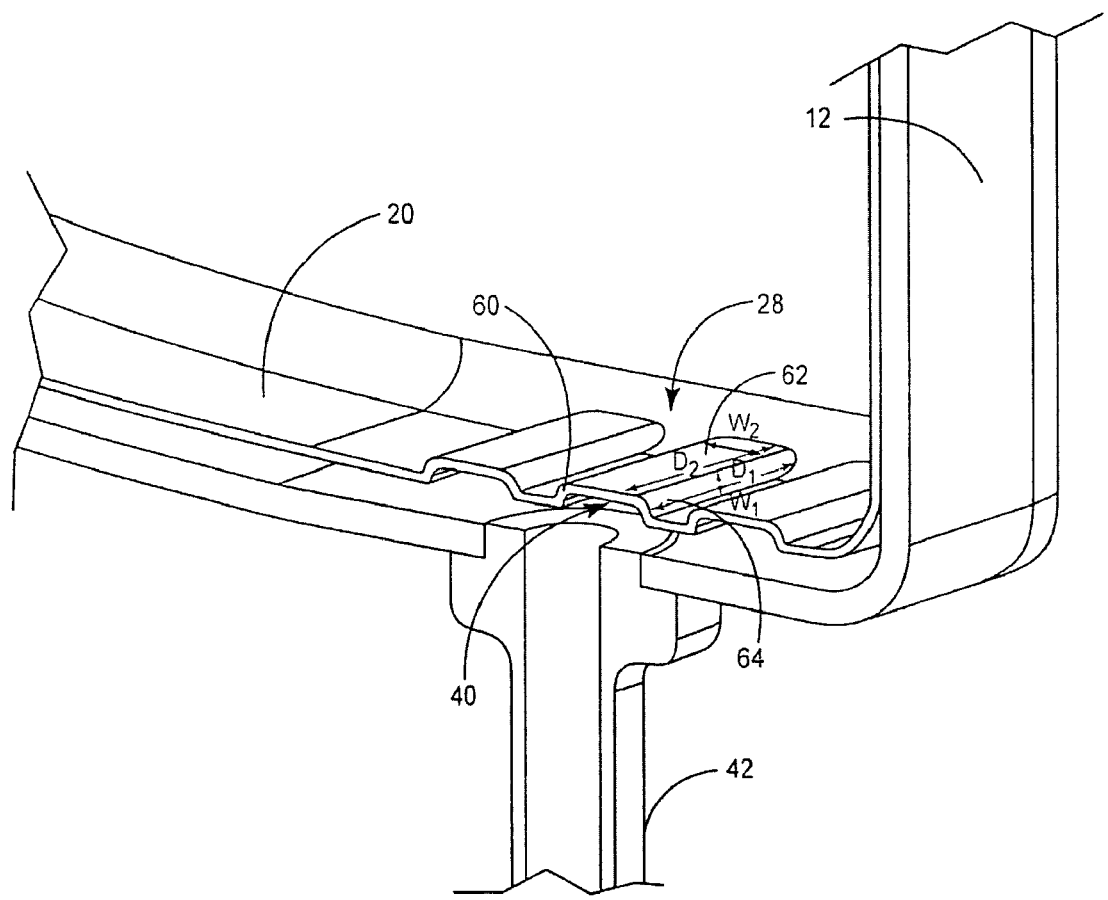
FIG. 3A is a partial perspective cross-sectional view of a fill port and the outer liner of FIG. 2.
Figure 3B:
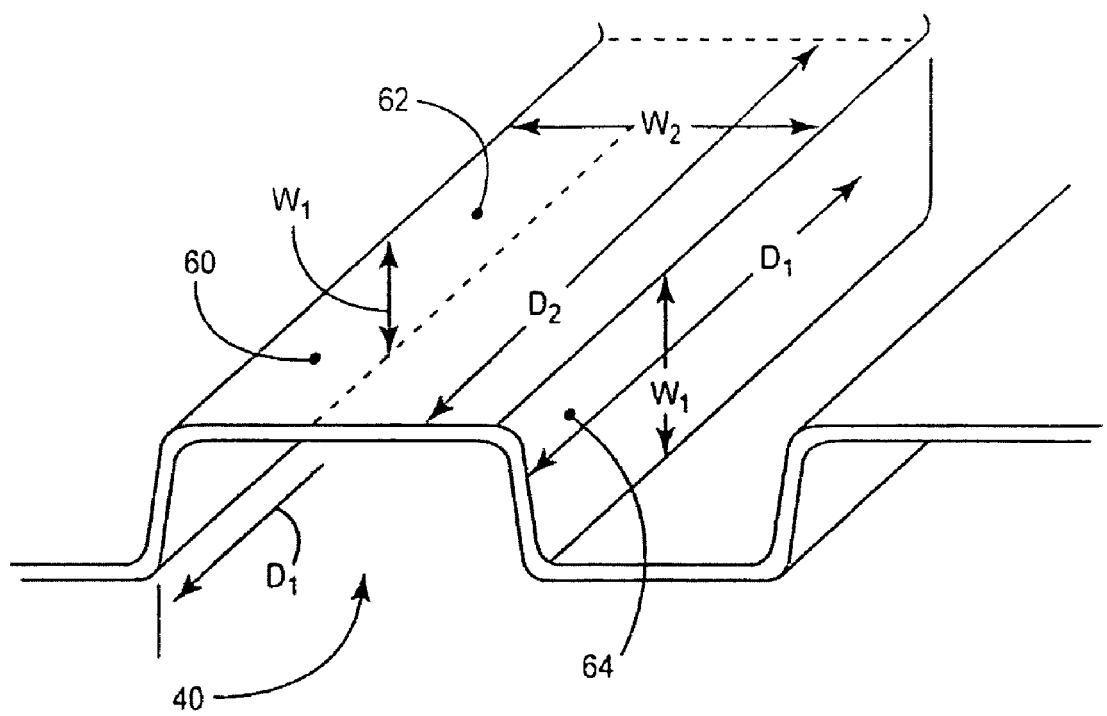
FIG. 3B is an enlarged partial perspective view of a notch or recessed region in an exemplary liner of FIG. 2.
Figure 4:
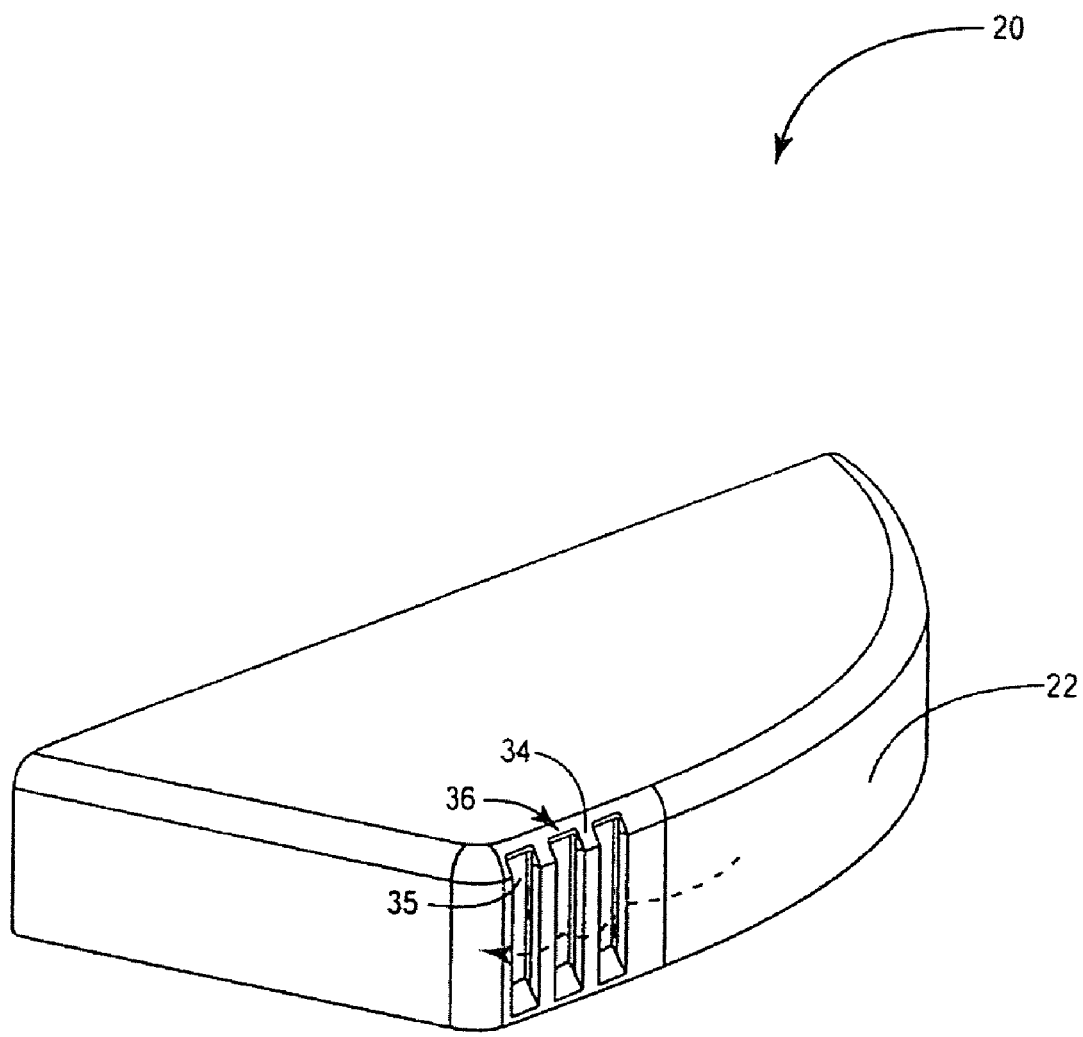
FIGS. 4 and 5 are cutaway views of the outside of the outer liner depicted in FIG. 2.
Figure 5:
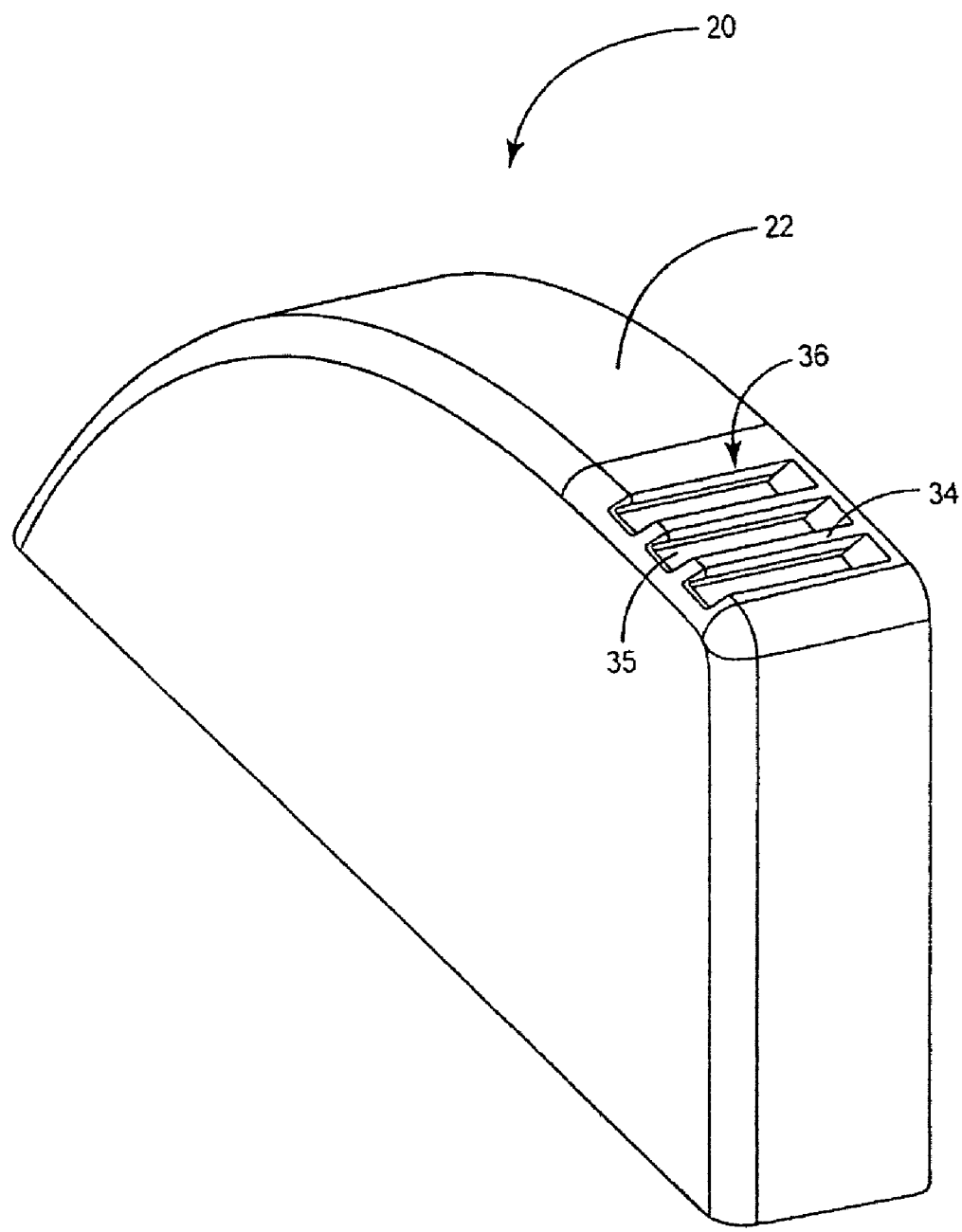
Figure 6:
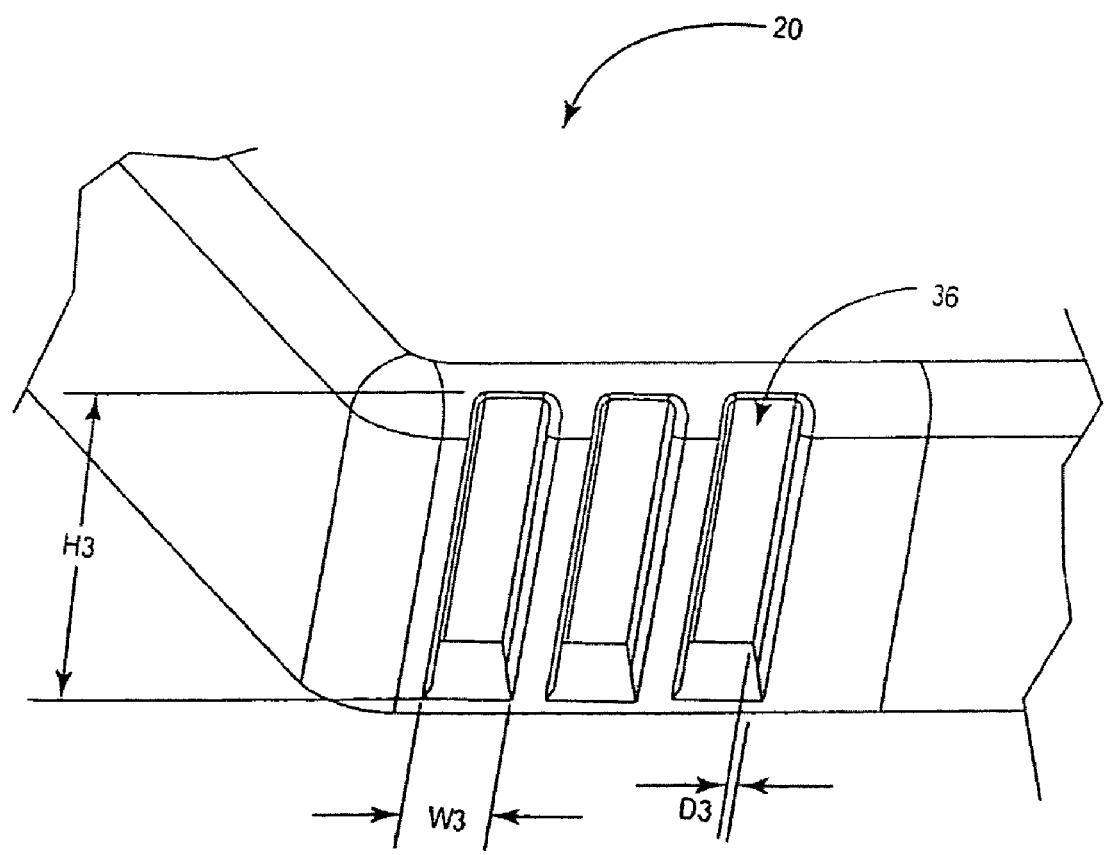
FIG. 6 is a side view of an exemplary ridge and recessed region formed in an exemplary outer liner.

Curved side 22 includes a recessed portion or notch 28. Recessed portion or notch 28 lacks an aperture through its thickness. Recessed portion 28 ensures a gap 40 that ranges from about 0.002 inches to about 0.007 inches between outer liner 20 and fill port 42. In another embodiment, recessed portion 28 ensures a gap 40 that exceeds 0.002 inches. In still yet another embodiment, recessed portion 28 ensures a gap 40 that can be less than 0.020 inches. Gap 40 prevents outer liner 20 from blocking fill port 42. Referring briefly to FIG. 3, recessed portion 28 can be defined by first, second, and third sides 60, 62, 64; however, skilled artisans appreciate that numerous configurations exist for forming recessed portion 28. First and third sides 60, 64 have a width (W1) of about 0.002 inches to about 0.007 inches, a depth (D1) of about 0.119 inches. Second side 62 has a width (W2) of about 0.060 inches and a depth (D2) of about 0.119 inches.

Figure 2:
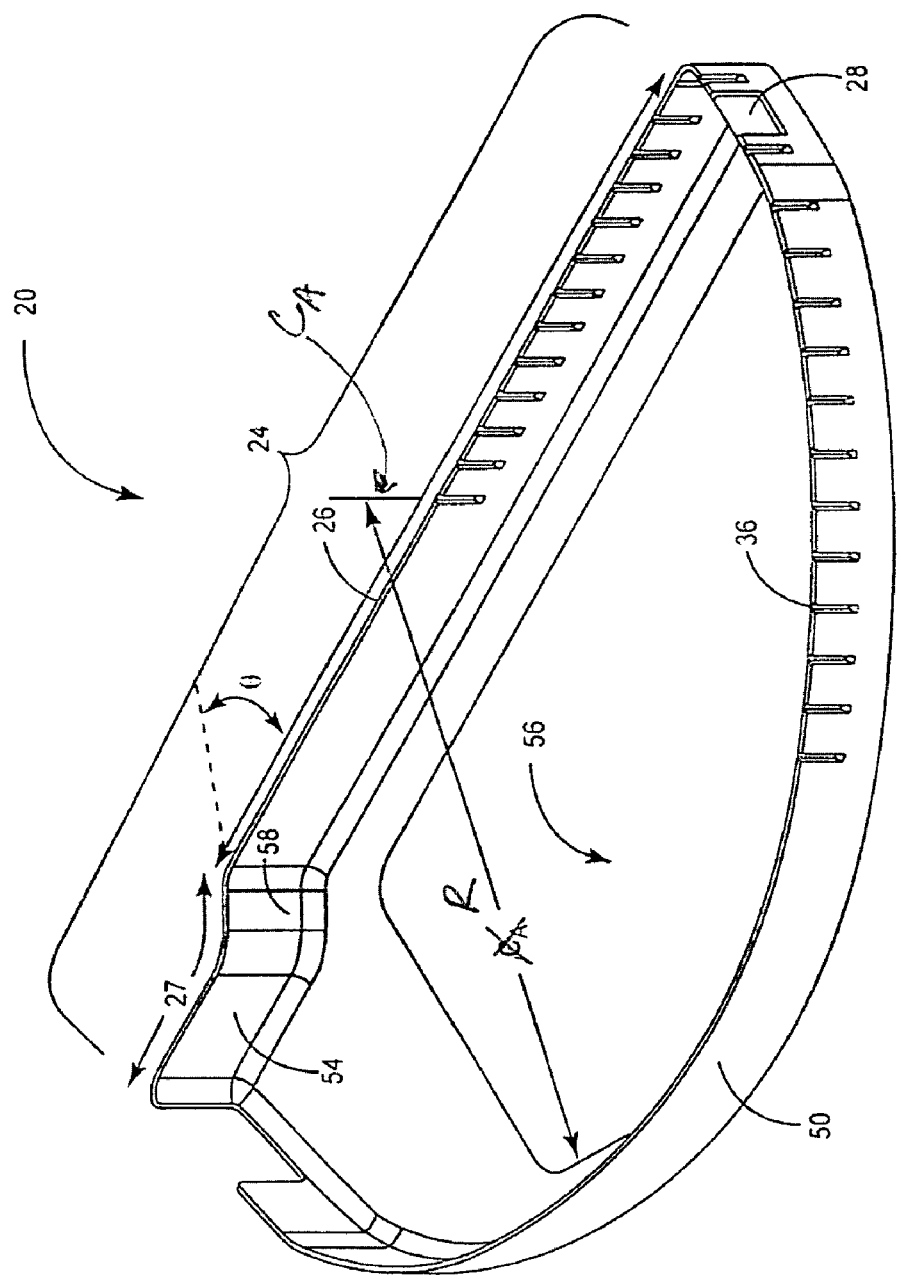
FIG. 2 is a top angled perspective view of an exemplary half portion (outer liner) of a two-part liner assembly for the capacitor depicted in FIG. 1.

Referring to FIG. 2, curved and straight sides 22, 24 can also optionally include a plurality of recessed regions 36 that assist in the efficient flow of electrolyte and/or gas via fill port 42. Recessed regions 36, depicted in greater detail in FIG. 4, can include ridges 34 and recessed wall 35. Generally, the outer liner improves the introduction of the electrolyte into the capacitor by routing the electrolyte into the fill port through the gap.

Figure 7:
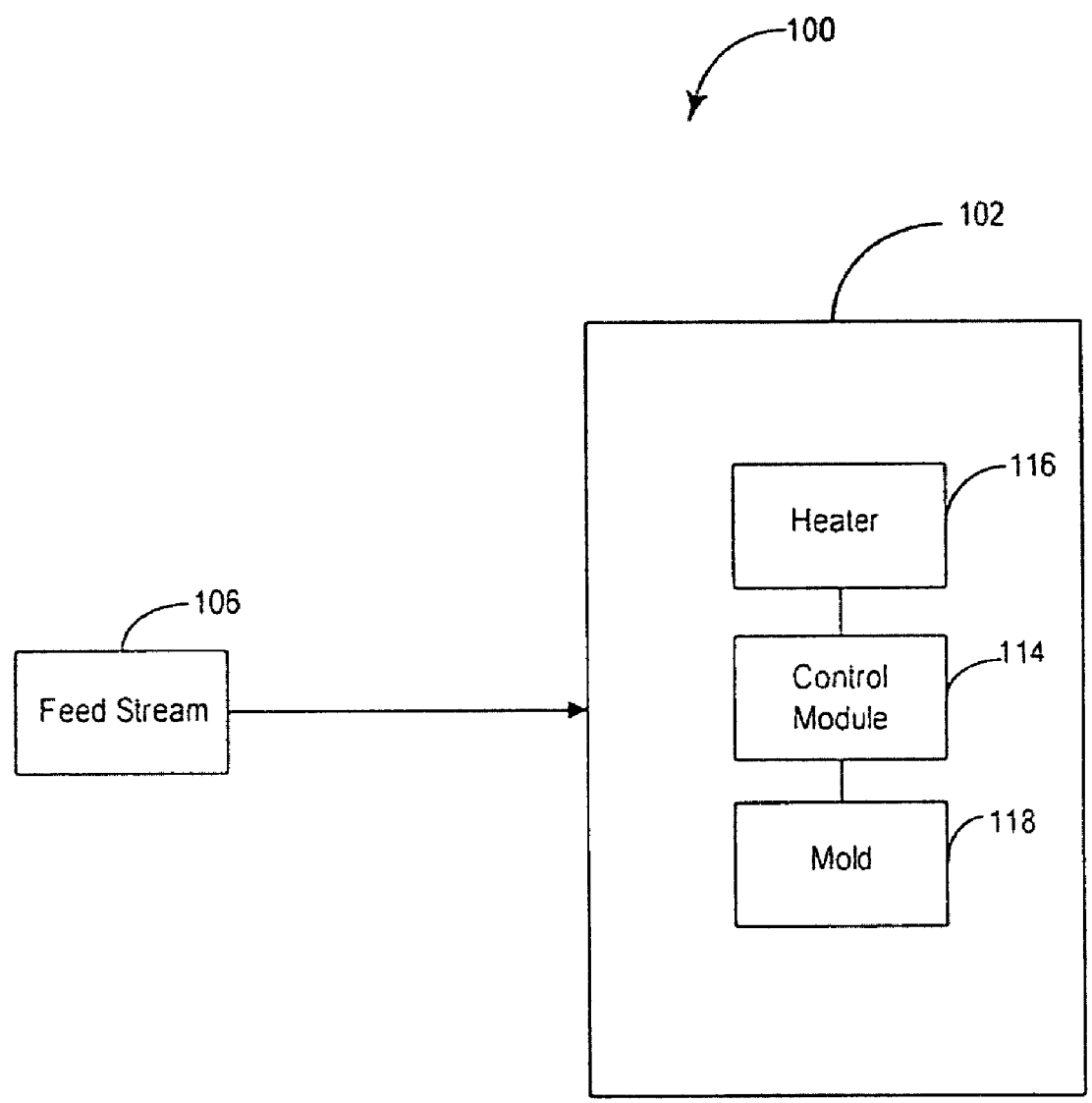
FIG. 7 is a schematic diagram of a system to fabricate an exemplary liner.

FIG. 7 is system 100 that automatically produces liner 20. System 100 includes a molding apparatus 102 and a feed stream 106 (e.g. polymer including polysulfone, polypropylene, polyethylene, polyimide, ethylene/tetrafluoroethylene copolymer (ETFE) etc.) such that the subsequently produced outer liner 20 is colorless, which allows an operator to visually detect the subsequent assembly of outer liner 20 with electrode assembly 14. Polysulfone is commercially available from SOLVAY S.A. located in Brussels. Molding apparatus 102 includes a control module 114, a heater 116, and a mold 118. Control module 114 includes instructions for controlling the molding process (e.g. thermoforming process) to produce liner 20. For example, control module 114 causes feed stream 106 (e.g. sheets of thermoplastic film) to be placed or fed into molding apparatus 102. Specifically, feed stream 106 is introduced into a frame (not shown) of, for example, a thermoforming machine. The thermoforming machine automatically repositions feed stream 106 to a heating zone where heat is applied to feed stream 106. When feed stream 106 is sufficiently softened, the thermoforming machine then returns feed stream 106 to a position near mold 118. Immediately mold 118 moves into contact with feed stream 106 and forming occurs.

Mold 118 includes depressions that correspond to ridges 34 and recessed region 28. Formation of liner 20 takes less than 30 seconds from the time in which the feed stream is fed into mold 118. After outer liner 20 is cooled to a certain temperature, outer liner 20 is then ejected from mold 118. Excess thermoplastic material is then trimmed from liner 20.

Figure 8:
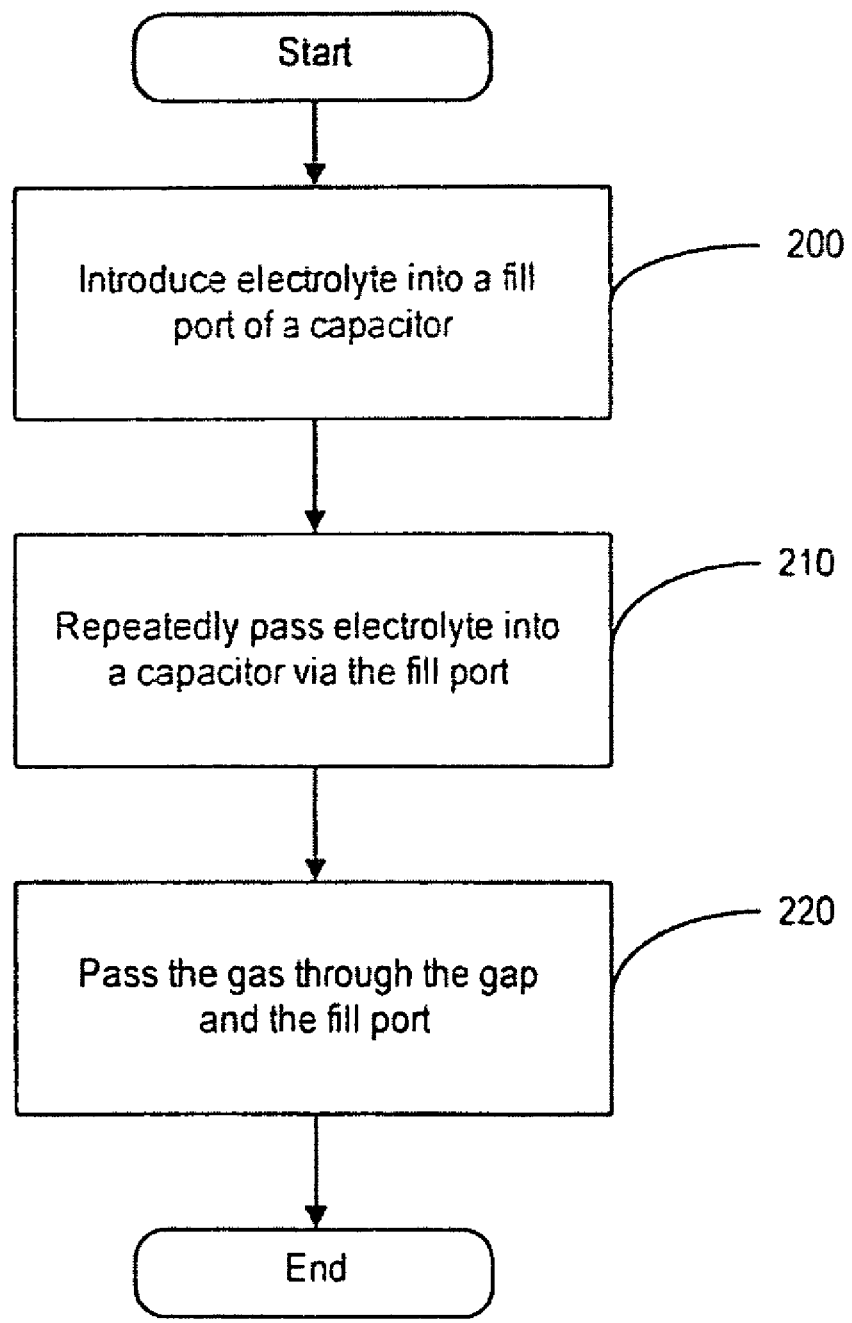
FIG. 8 is a flow diagram for using a capacitor that includes an exemplary outer liner.

FIG. 8 is a flow diagram for venting gas through a fill port. At operation 200, an electrolyte is introduced via a fill port to a capacitor. At operation 210, the electrolyte may be repeatedly passed through a gap formed by a recessed portion in a liner and the fill port. The recessed portion is directly across from the opening of the fill port. The fill port is not blocked by the outer liner. At operation 220, gas passes through the gap and out the fill port.

Figure 9:
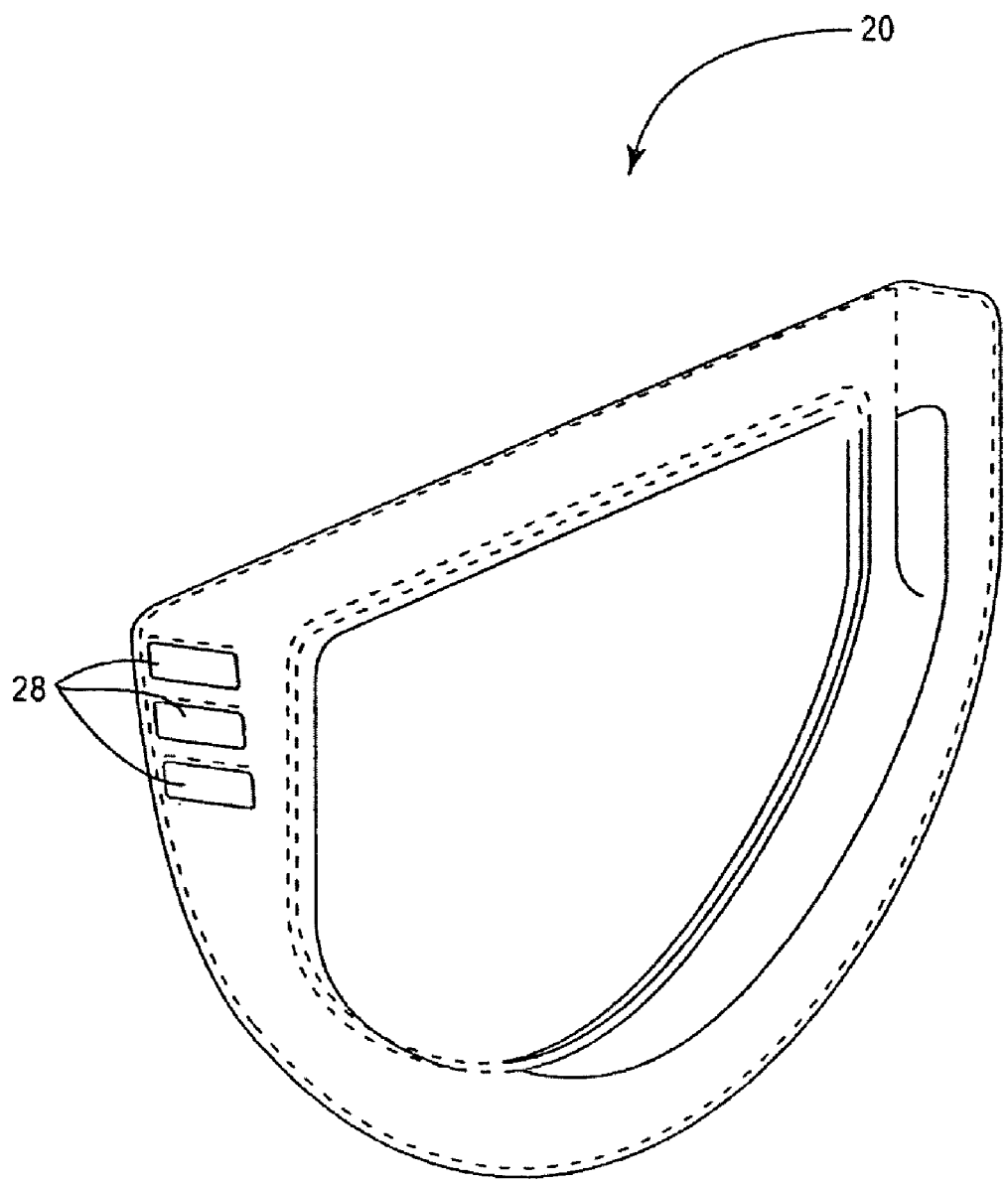
FIG. 9 is an angled side perspective view of an exemplary single liner for a capacitor.
Figure 10A:
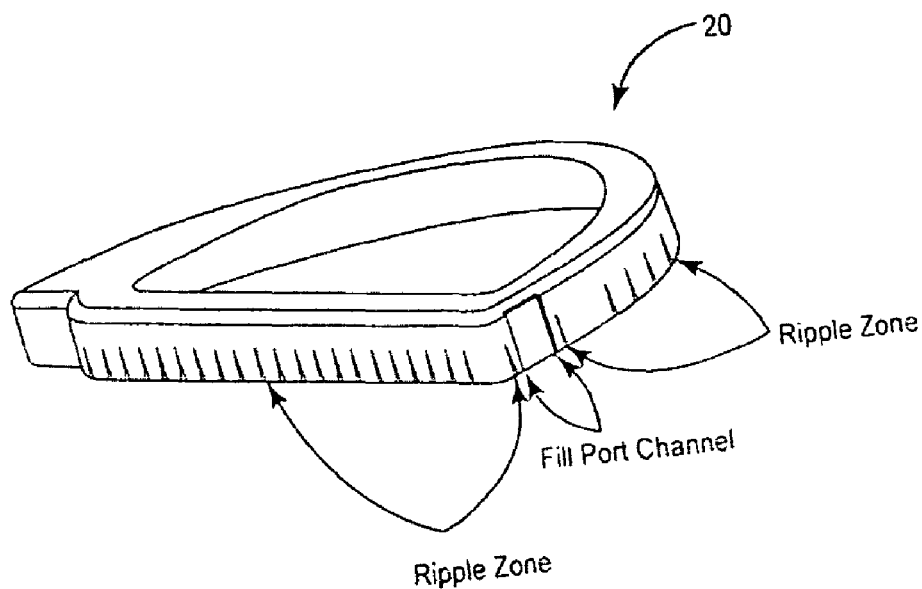
FIGS. 10A and 10B are an angled top perspective views of two embodiments of an exemplary outer liner.
Figure 10B:
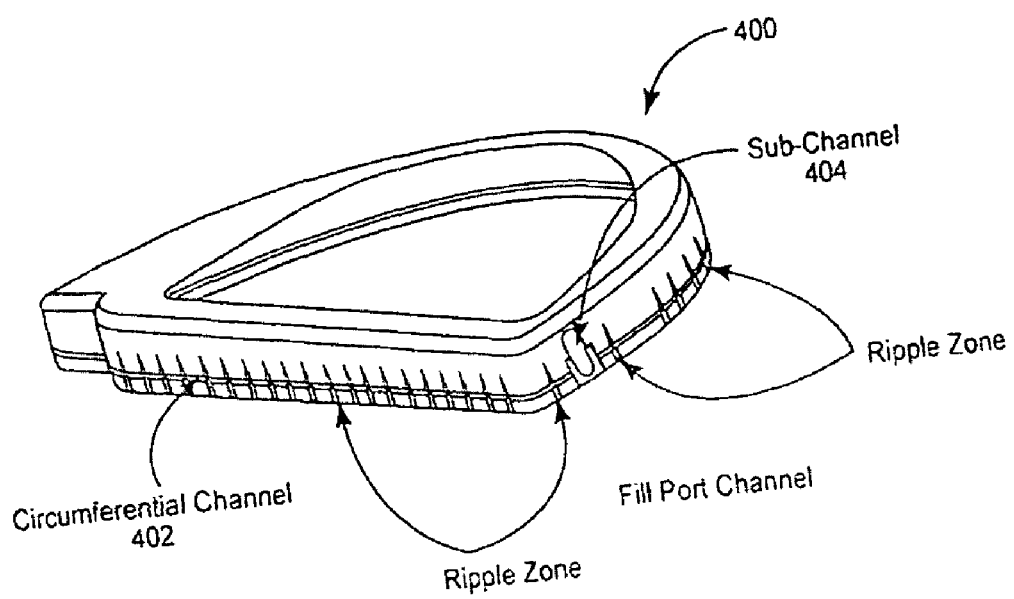
Figure 11A:
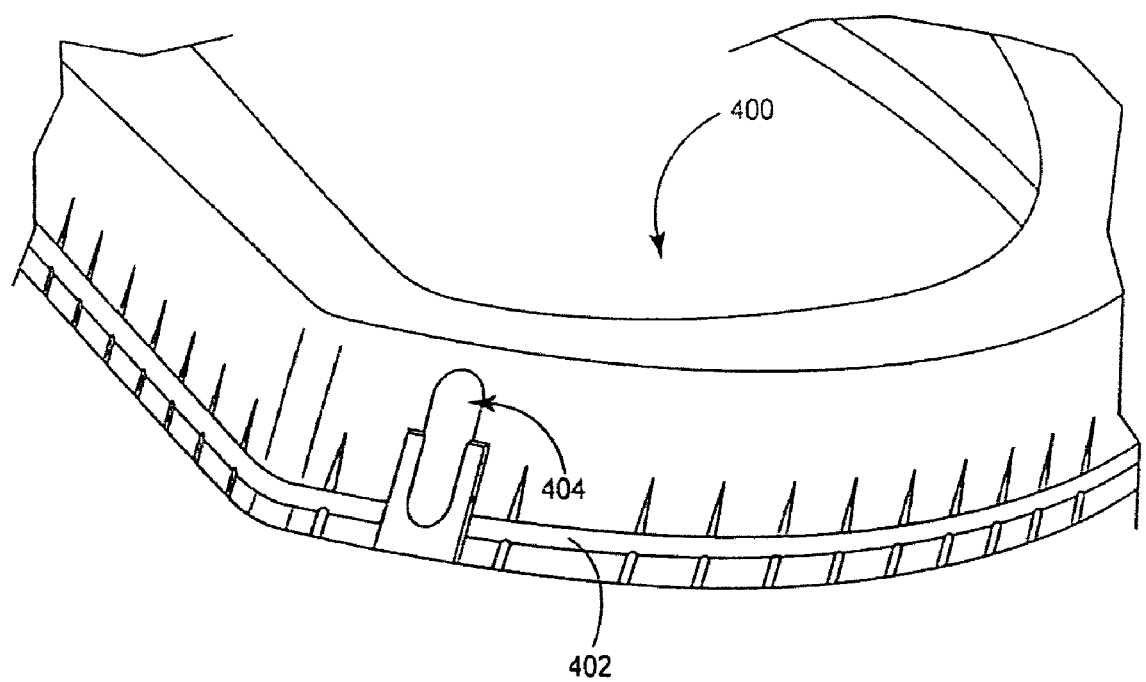
FIGS. 11A and 11B are enlarged perspective views of the outer liner depicted in FIG. 10B.
Figure 11B:
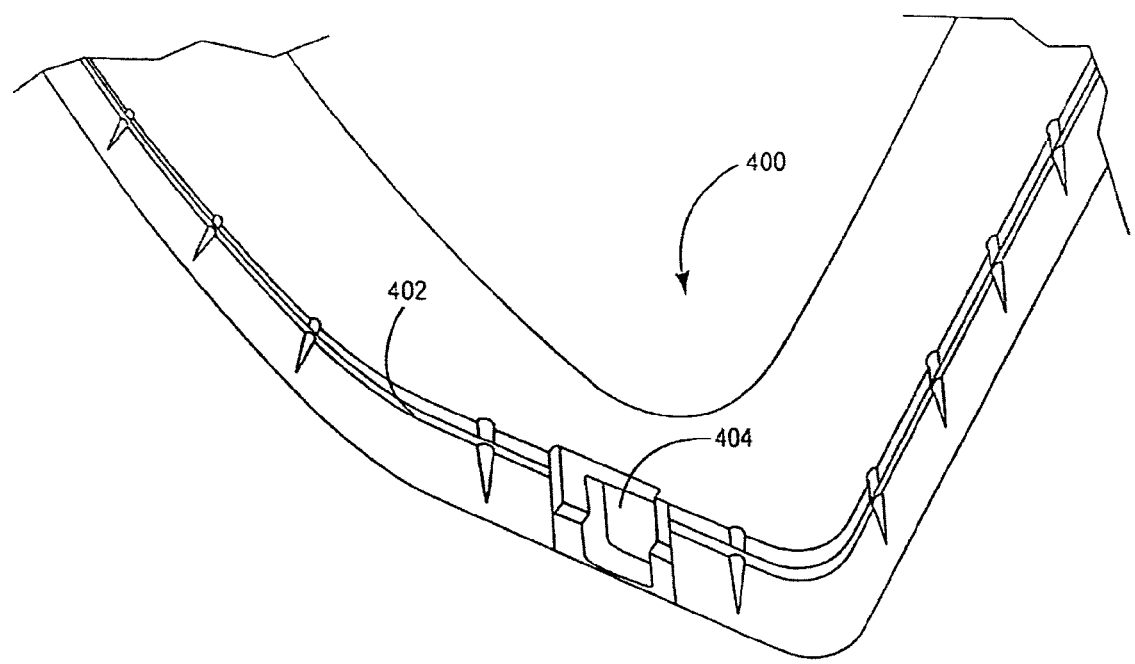

Numerous alternative embodiments can implement the present disclosure. For example, FIG. 9 illustrates that the inner and outer liner depicted in FIG. 1 can also be configured to as a single liner 300 with a recessed region 28. Additionally, while outer liner 20 is depicted with a certain number of recessed regions, (e.g. 28 recessed regions), skilled artisans understand that at least one to various numbers of recessed regions may be formed in liner 20. Another alternate embodiment is depicted in FIG. 10B. In this embodiment, liner 400 includes circumferential channel 402 and subchannel 404, which are lacking in liner 20 shown in FIG. 10A. Circumferential channel 402 and subchannel 404 provide additional routes for electrolyte and/or gas to pass through fill port 42. Circumferential channel 402 entirely surrounds liner 400 and has a depth that ranges from about 0.001 inches to about 0.006 inches. Subchannel 404 has a height of about 0.119 inches and a depth of about 0.003-0.007 inches. Skilled artisans appreciate that while dimensions are presented herein, the present disclosure contemplates a variety of dimensions being used to implement capacitor liners with a notch or recessed region capable of creating a gap to ease fluid flow through the tube.

While the invention has been described in its presently preferred form, it will be understood that the invention is capable of modification without departing from the spirit of the invention as set forth in the appended claims.

What is claimed is:

1. A liner for a capacitor comprising:
   a curved side;
   a straight side;
   a bottom side between the curved side and the straight side; and
   a recessed portion along the curved side, the recessed portion comprises a first side, a second side, and a third side to create a gap for preventing an opposing tube from blockage by the liner.

2. The liner of claim 1 further comprising:
   a plurality of recessed regions along the liner.

3. A liner for a capacitor comprising:
   a curved side;
   a straight side;
   a bottom side between the curved side and the straight side;
   a recessed portion along the curved side, the recessed portion comprises a first side, a second side, and a third side to create a gap for preventing an opposing tube from blockage by the liner;
   a circumferential channel that substantial surrounds the curved and straight sides; and
   a sub channel disposed on the curved side adjacent to a fill port channel.

* * * * *

UNITED STATES PATENT AND TRADEMARK OFFICE
CERTIFICATE OF CORRECTION

PATENT NO. : 8,179,663 B2
APPLICATION NO. : 12/115345
DATED : May 15, 2012
INVENTOR(S) : Brabeck et al.

It is certified that error appears in the above-identified patent and that said Letters Patent is hereby corrected as shown below:

Col. 4, line 56, delete "that substantial surrounds" and insert in place thereof --that substantially surrounds--;

Signed and Sealed this
Thirtieth Day of October, 2012

David J. Kappos
*Director of the United States Patent and Trademark Office*